(12) United States Patent
Shinkevich

(10) Patent No.: US 7,587,086 B2
(45) Date of Patent: Sep. 8, 2009

(54) IDENTIFYING SELECTED PIXELS IN A DIGITAL IMAGE

(75) Inventor: Sergei S Shinkevich, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 592 days.

(21) Appl. No.: 10/861,207

(22) Filed: Jun. 4, 2004

(65) Prior Publication Data

US 2005/0271272 A1    Dec. 8, 2005

(51) Int. Cl.
*G06K 9/34*    (2006.01)
(52) U.S. Cl. ..................................... 382/173
(58) Field of Classification Search .............. 382/173
See application file for complete search history.

(56) References Cited

U.S. PATENT DOCUMENTS

| | | | | |
|---|---|---|---|---|
| 3,899,771 A * | 8/1975 | Saraga et al. | ............... | 382/198 |
| 4,368,462 A * | 1/1983 | Crawley | ..................... | 345/530 |
| 4,685,141 A * | 8/1987 | Hoque et al. | ................ | 382/138 |
| 4,862,388 A * | 8/1989 | Bunker | ........................ | 345/427 |
| 4,897,717 A * | 1/1990 | Hamilton et al. | ........ | 375/240.07 |
| 5,018,216 A * | 5/1991 | Kojima | ........................ | 382/170 |
| 5,182,777 A * | 1/1993 | Nakayama et al. | .......... | 382/170 |
| 5,553,196 A * | 9/1996 | Takatori et al. | ................ | 706/31 |
| 5,666,440 A * | 9/1997 | Hozumi | ....................... | 382/198 |
| 5,745,095 A * | 4/1998 | Parchem et al. | ............. | 345/633 |
| 5,920,356 A * | 7/1999 | Gupta et al. | ................. | 348/606 |
| 6,061,474 A * | 5/2000 | Kajiwara et al. | ............. | 382/238 |
| 6,400,838 B2 * | 6/2002 | Watanabe | .................... | 382/144 |
| 6,429,895 B1 * | 8/2002 | Onuki | .................... | 348/208.99 |
| 6,453,080 B1 * | 9/2002 | Kao | ........................... | 382/312 |

* cited by examiner

*Primary Examiner*—Bhavesh M Mehta
*Assistant Examiner*—David P Rashid

(57) ABSTRACT

The present application provides for accurately identifying a selection of pixels in a digital image. A pixel edgewalk procedure utilizes pixel reference points situated around a pixel, such as at pixel vertices, to determine where to draw an outline to encompass selected pixels. Each pixel reference point is represented by one or more bits in memory that indicate certain information about each particular pixel reference point and pixels surrounding the pixel reference point. Utilizing this information, a determination is made as to where an outline can be drawn according to certain pixel reference points to encompass only pixels that are selected pixels. Resource overhead for determining bit settings for some pixel reference points is reduced by utilizing a bit-wise shift in memory bits allocated to an adjacent pixel reference point.

28 Claims, 10 Drawing Sheets

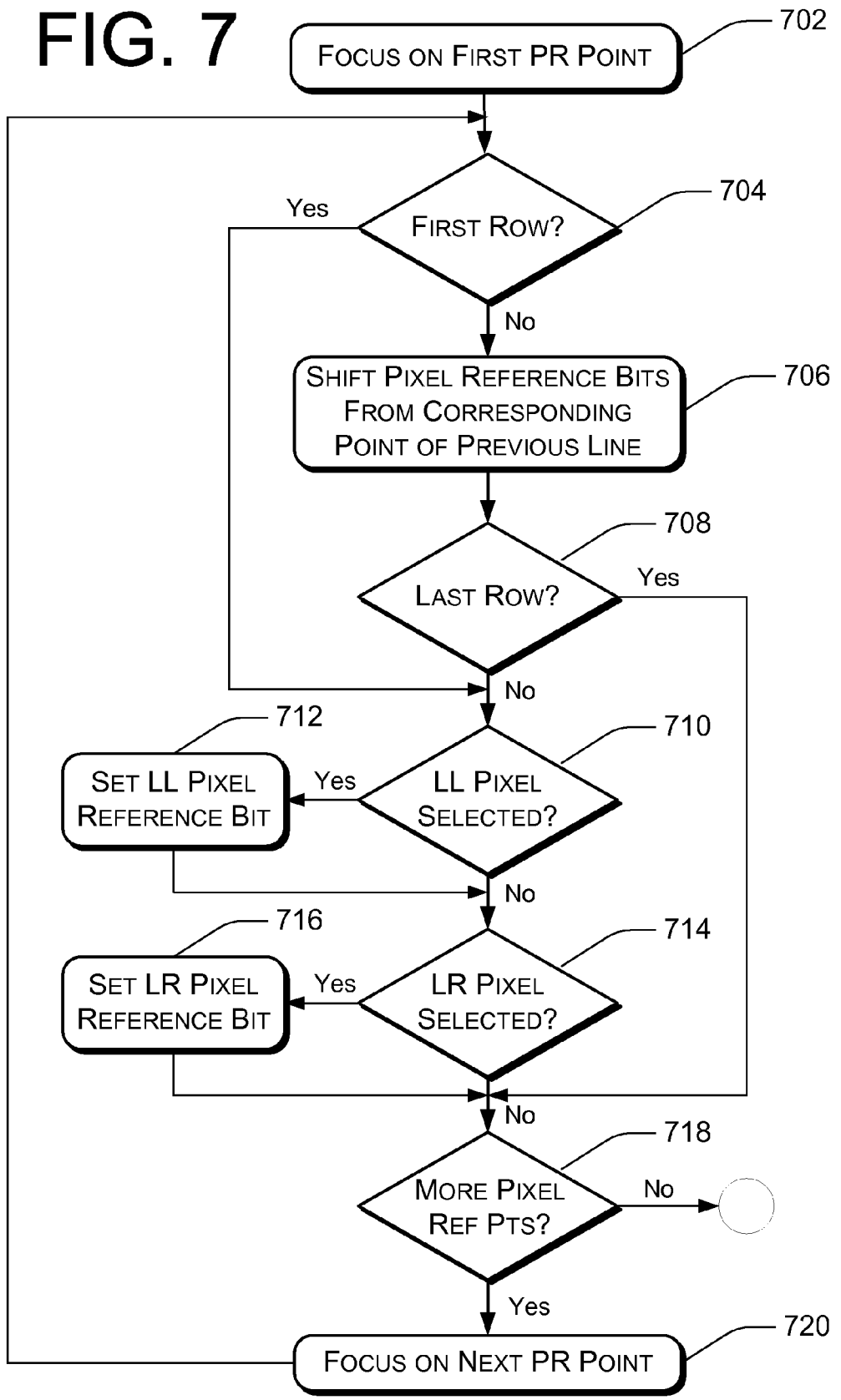

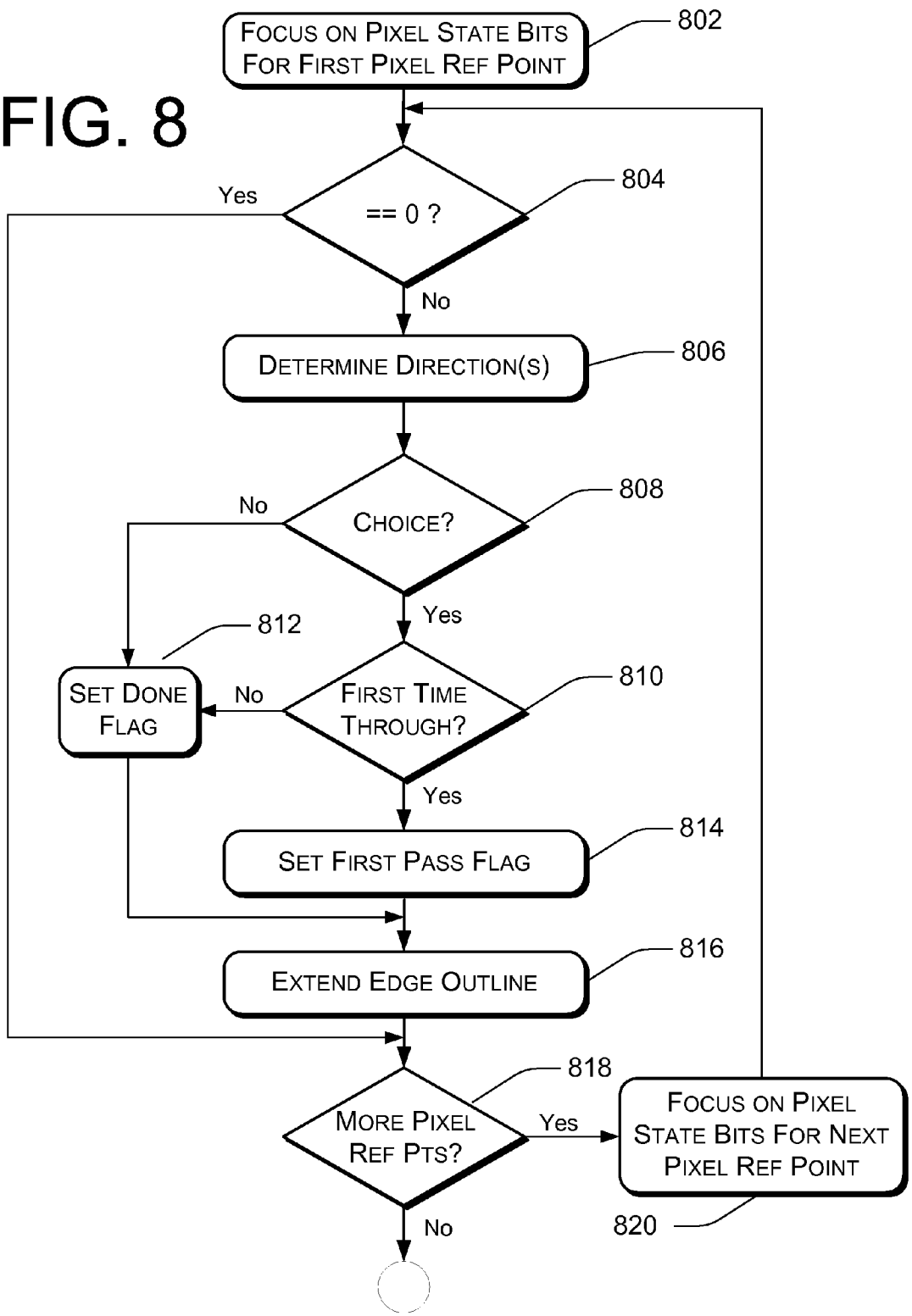

IDENTIFYING SELECTED PIXELS IN A DIGITAL IMAGE

TECHNICAL FIELD

The description provided herein relates generally to digital images. More particularly, the present description relates to displaying selected pixels of a digital image.

BACKGROUND

Advances in digital photography technology and decreasing costs for quality equipment have resulted in an increasingly popular interest in digital imaging editing systems. With today's technology, even amateurs in digital imaging are familiar with digital imaging applications that allow users to enhance digital image color, focus, contrast, etc. Such applications also provide tools with which users can cut, paste and format particular selections within an image.

Manipulating a digital image typically requires some way to select one or more portions of an image for enhancement, moving, copying, formatting, etc. Coincident with this is a need to display selections to a user so that the user can know what portions of an image have been selected. One way in which this is done is to provide an outline, or border, around an object or area that has been selected by a user. Many times, a selection outline is provided in the form of "marching ants"—an animated dotted line that is drawn around the selection.

In a typical case, a best-fit method is used to determine a best fit line through and/or around selected pixels. With a best-fit method, some selected pixels are only partially encompassed by the best-fit line used to outline the selection. As a result, a user typically gets an inaccurate representation of the selected pixels.

SUMMARY

The following detailed description provides for accurately identifying a selection of pixels in a digital image. As a result, selected pixels can be encompassed by a selection outline and pixels that are not selected are not included within the selection outline.

In at least one implementation described herein, a pixel edgewalk procedure utilizes pixel reference points situated around a pixel, such as at pixel vertices, to determine where to draw an outline to encompass selected pixels. Each pixel reference point is represented by one or more bits in memory that indicate certain information about each particular pixel reference point and pixels surrounding the pixel reference point. Utilizing this information, a determination is made as to where an outline can be drawn according to certain pixel reference points to encompass only pixels that are selected pixels.

In at least one other implementation, resource overhead for determining bit settings for some pixel reference points is reduced by utilizing a bit-wise shift in memory bits allocated to an adjacent pixel reference point.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 7 is a flow diagram depicting an exemplary methodological implementation of identifying selected pixels in a digital image.

FIG. 8 is a flow diagram depicting an exemplary methodological implementation of determining a visual identification of selected pixels in a digital image.

DETAILED DESCRIPTION

The present description provided in connection with the appended drawings is intended as a description of one or more exemplary implementations for identifying selected pixels in a digital image and is not intended to represent the only possible implementations. Furthermore, the description sets forth one or more functions and one or more sequences of steps for identifying selected pixels in a digital image. However, the same or equivalent functions and sequences may be accomplished by alternate implementations that are also intended to be included within the spirit and scope of the following description.

Exemplary Digital Image

Figure 1:
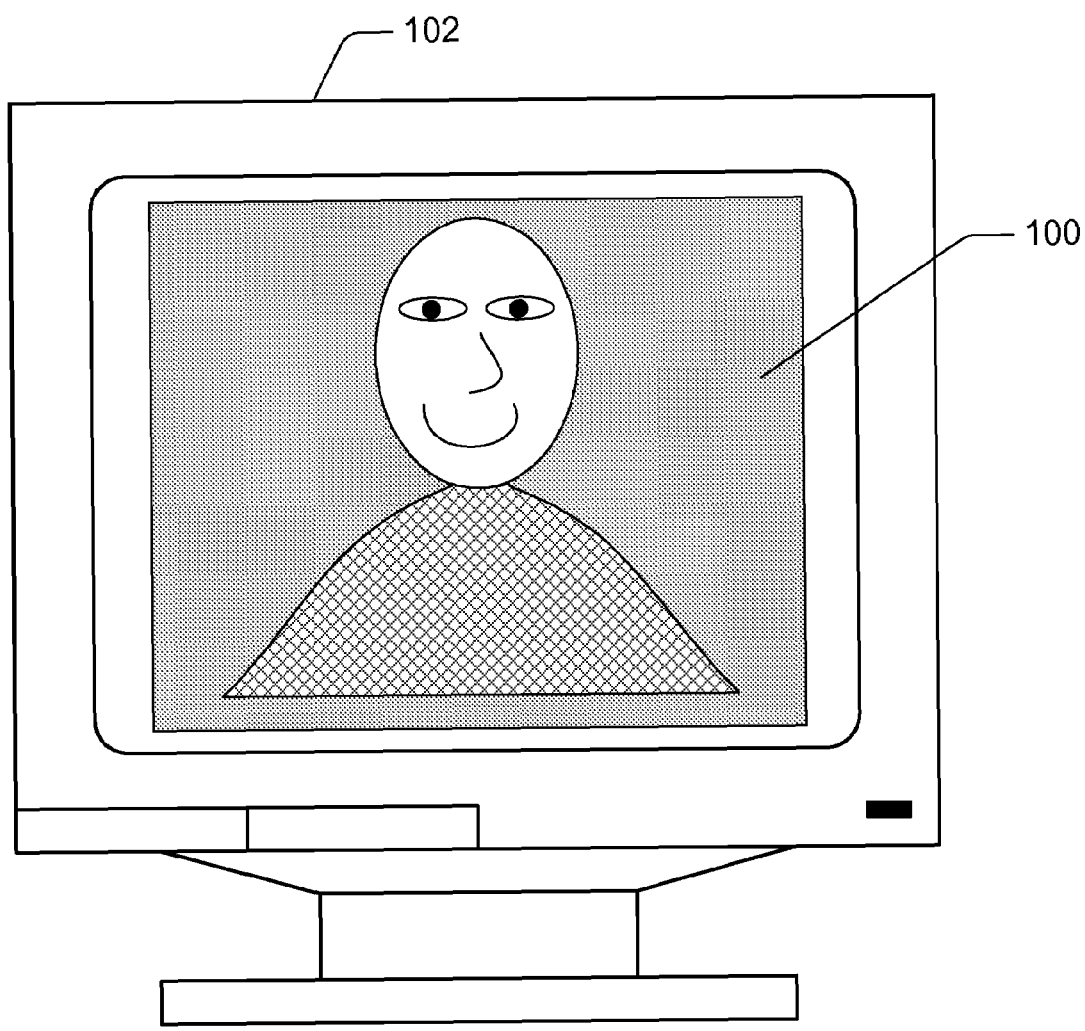
FIG. 1 is an illustration of a prior art display device for displaying a digital image.
Figure 2:
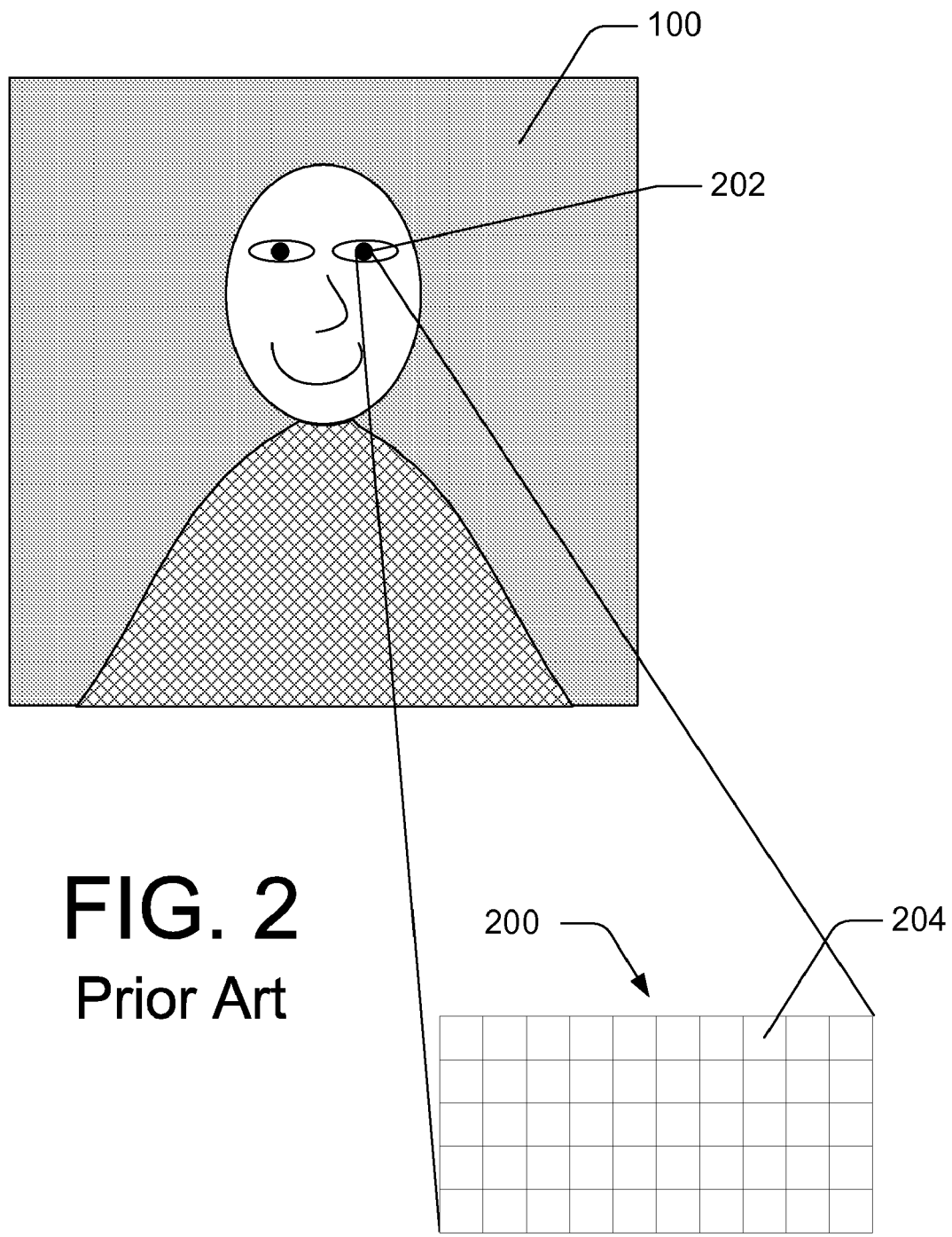
FIG. 2 is an illustration of a prior art digital image.

FIG. 1 is a simplified exemplary digital image 100 as known in the art. The image 100 is shown displayed on a display monitor 102 that is capable of displaying digital images. FIG. 2 is an illustration of the digital image 100 shown in FIG. 1. An expanded view 200 of an area 202 of the digital image 100 shows a close-up view of an eye included in the digital image 100. The expanded view 200 shows individual pixels 204 that make up the area 202 indicated in the digital image 100. Although only a small portion of the digital image 100 is shown to illustrate individual pixels 204, it is noted that the entire digital image 100 is comprised of individual pixels that are too small to be shown individually in FIG. 2.

Figure 3A:
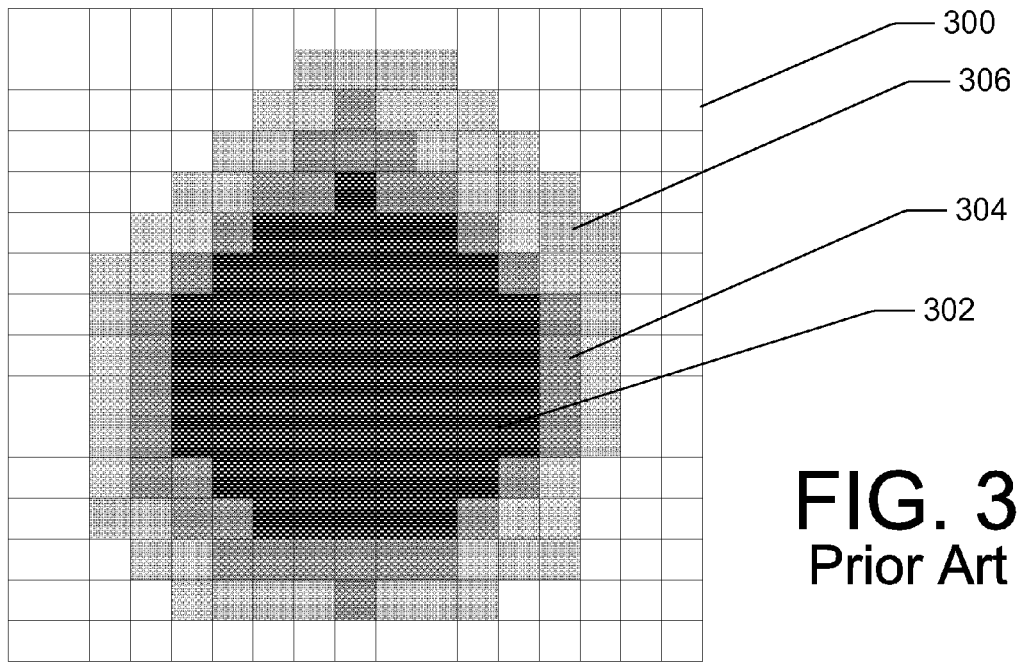
FIG. 3a is a representation of digital image pixels as known in the art.

FIG. 3a is a representation of digital image pixels 300 similar to the expanded area 202 shown in FIG. 2. The pixels 300 represent a digital image of a human eye and includes— for this example—pixels of at least three colors: pixels of a first color 302; pixels of a second color 304; and pixels of a third color 306. As used in this context, the term "color" may refer to a unique color or to one of several shades of a color.

Figure 3B:
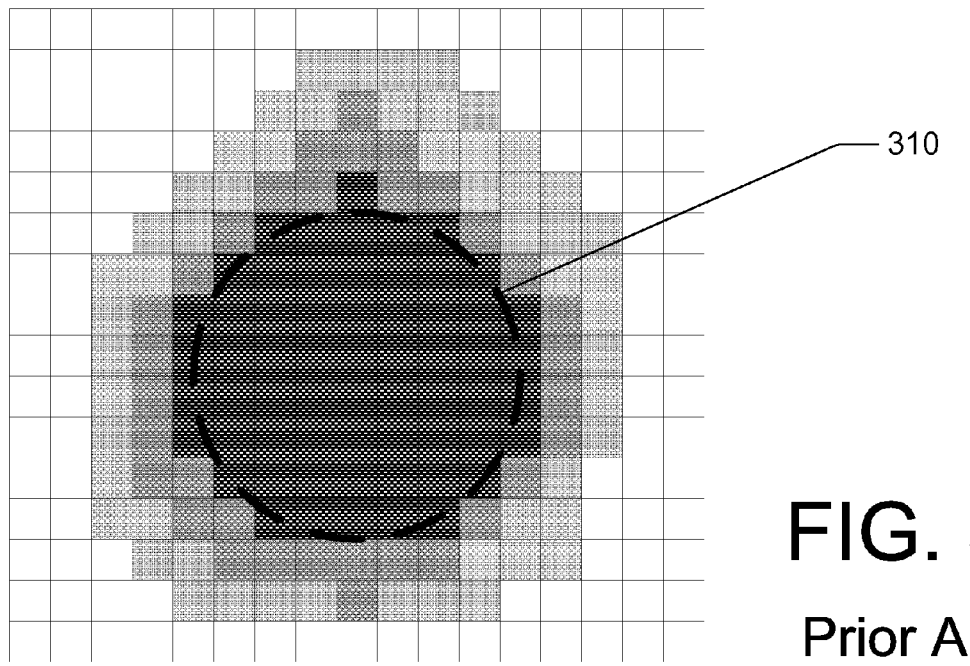
FIG. 3b is a representation of a prior art pixel selection in a digital image.

FIG. 3b is a representation of a pixel selection identifier 310 superimposed over the digital image pixels 300 of FIG. 3a in an instance in which the pixels of the first color 302 are selected. In at least one application, a user may act to select all pixels of a particular color. In the present example, the pixels of the first color 302 represent a pupil of a human eye. This is a typical way known in the art to identify pixels that have been selected by a particular application. The pixel selection identifier 310 encompasses as many selected pixels as possible using a "best fit" method to determine where to draw the pixel selection identifier 310 around selected pixels.

Utilization of such a method can cause some selected pixels to be completely encompassed by the pixel selection identifier 310 while other selected pixels are only partially encompassed by the pixel selection identifier 310. While this may be adequate in some—but not all—situations where a pixel selection is simply identified to a user, this method falls short when subsequent processing is performed on selected pixels.

The present application describes how to avoid partially identifying selected pixels by encompassing all selected pixels within a pixel selection identifier.

Pixel Reference Points

Figure 4A:
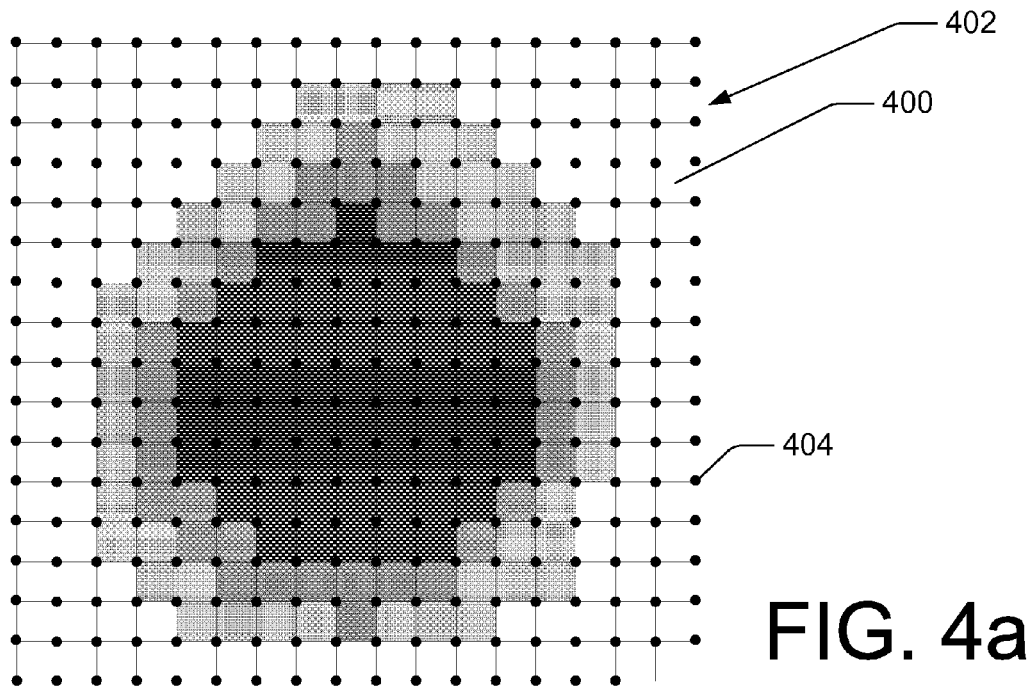
FIG. 4a is an exemplary representation of digital image pixels with designated pixel reference points.

FIG. 4a is an exemplary representation of pixels 400 included in a digital image 402 (in the continuing example of a portion of a human eye) as shown in previous figures. However, FIG. 4a also includes several pixel reference points 404 located at vertices of individual pixels. Each pixel (represented in the shape of a square) has four vertices and, thus, four pixel reference points 404. However, each pair of adjoining pixels shares a pair of pixel reference points. In the following description, processes use pixel reference points instead of individual pixels. The advantages of using pixel reference points will be apparent as the description progresses.

Although the present example shows pixels represented as squares and each pixel being associated with four pixel reference points, it is noted that pixels and/or pixel reference points may be represented in other ways without departing from the scope of the appended claims. The number of pixel reference points 404 shown in the present example is (pixel width+1)×(pixel height+1), wherein pixel width is a number of pixels included in a width of the digital image 402, and pixel height is a number of pixels included in a height of the digital image 402.

Figure 4B:
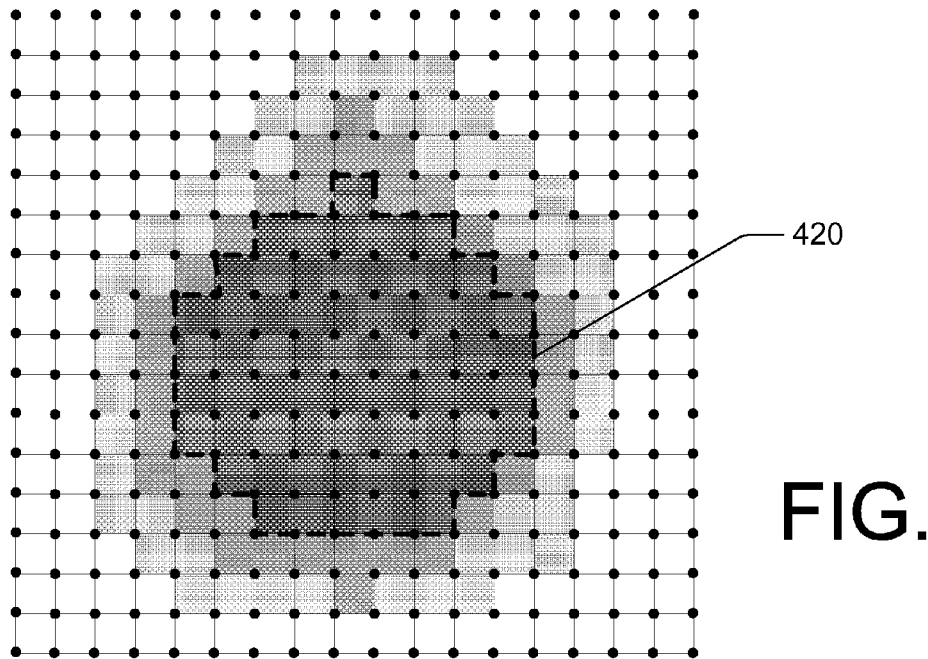
FIG. 4b is an exemplary representation of a pixel selection identifier in a digital image using pixel reference points.

FIG. 4b is an exemplary representation of pixels 410 similar to that shown in FIG. 4a, but also including a pixel selection identifier 420. The pixel selection identifier 420 is a segmented border drawn around the selected pixels. It is noted that the pixel selection identifier 420 does not transect any border pixel. As a result, selected pixels are definitely identified either for display or for subsequent processing of the selected pixels.

Exemplary Computing System

Figure 5:
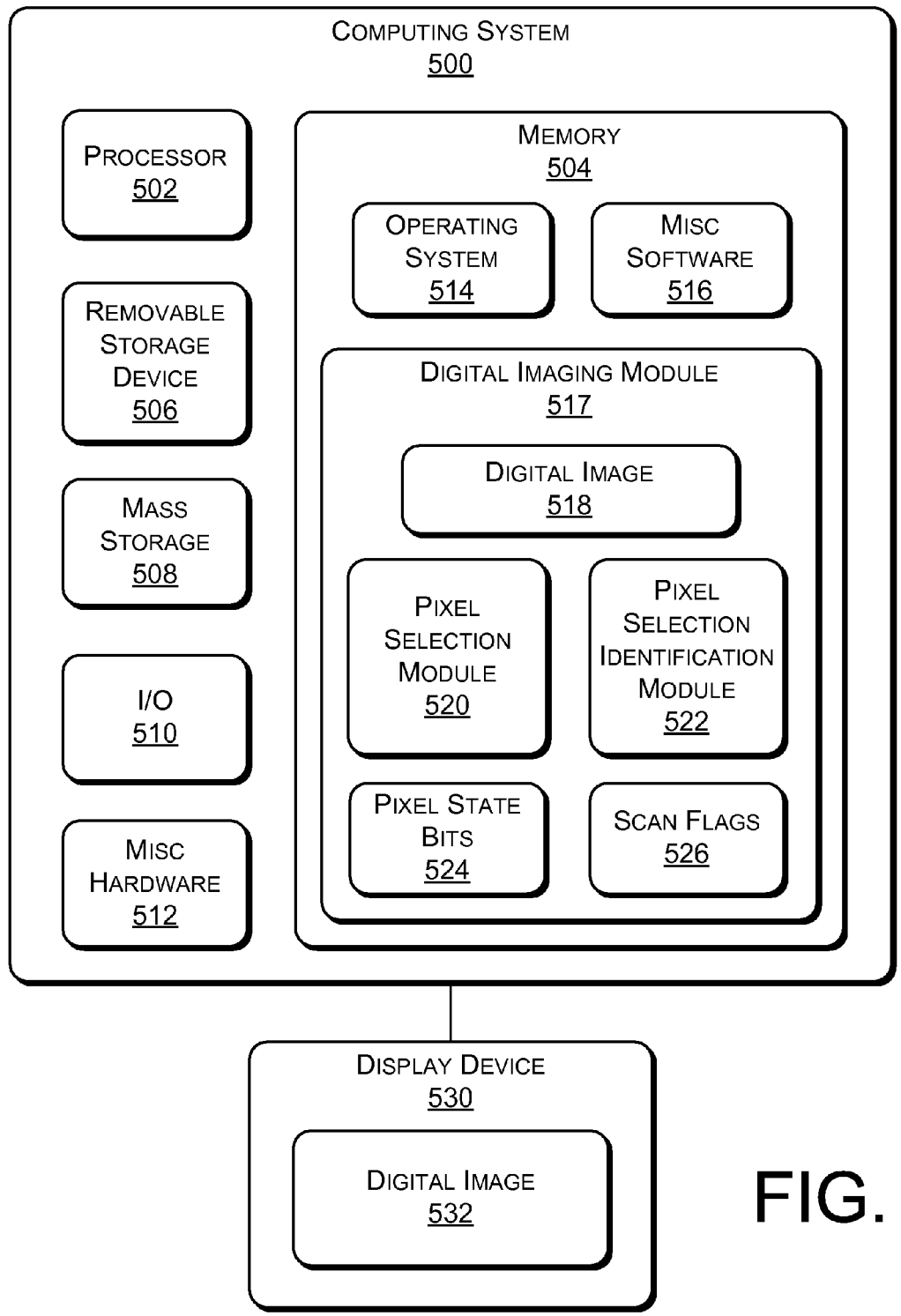
FIG. 5 is a block diagram of an exemplary computing system according to the description herein.

FIG. 5 is a block diagram of an exemplary computing system 500 conforming to the present description. The computing system 500 includes a processor 502 and memory 504. The computing system 500 also includes a removable storage device 506 (such as a CD-ROM drive), a mass storage device 508 (such as a hard disk drive) and an input/output (I/O) module 510 that my consist of one or more hardware and/or software modules configured to send and receive electronic data from and to the computing system 500. The computing system 500 may also include other miscellaneous hardware devices 512 typically found in computing systems and necessary to support functionality described herein.

The memory 504 is typically random access memory (RAM) but may be any type of memory known in the art. The memory 504 stores an operating system 514 and other miscellaneous software 516 that control various computing device functions. A digital imaging module 517 is also stored in the memory 504 and may comprise hardware and/or software. A digital image 518 is shown stored in the memory 504 within the digital imaging module 517, although, at times, there may be no digital image or more than one digital image stored in the memory 504. The digital image 518 may also be stored outside of the digital imaging module 517.

A pixel selection module 520 and a pixel selection identification module 522 are also stored in the memory. The pixel selection module 520 is configured to at least determine a set of one or more pixels that have been selected for processing. The pixel selection identification module 522 is configured at least to determine how to identify the selected pixels, such as by determining a border—or outline—of selected pixels to demarcate. The pixel selection identification module 522 utilizes one or more pixel state flags 524 and one or more scan flags 526 that are also stored in the memory 504. The pixel state flags 524 indicate which pixels surrounding a particular pixel reference point are selected and the scan flags 526 are used to identify whether particular pixel reference points have been scanned once, twice or not at all during a procedure to determine an edge or outline of selected pixels.

A display device 530 is connected to the computing device 500 and displays a digital image 532. The digital image 532 is a rendered version of the digital image 516 that is stored in the memory 504. Although shown separate from the computing system 500, it is noted that the display device 530 may be integrated within the computing system 500 in one or more alternate implementations.

It is noted that although the elements shown and described in FIG. 5 are shown as discrete modules with specified functionality attributed thereto, one or more alternative implementations may combine one or more of the elements shown and specific functions may be allocated differently among any of the elements. Furthermore, the elements included in the computing system 500 may comprise hardware, software or a combination thereof.

Exemplary Pixel State Flags and Scan Flags

Figure 6A:
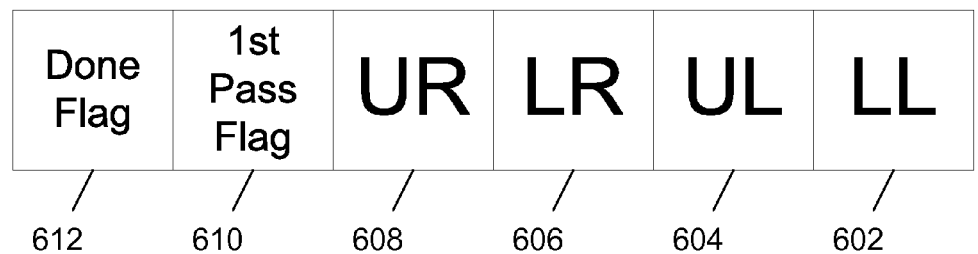
FIG. 6A is an exemplary representation of pixel state flags and scan flags as used herein.
Figures 6B, 6C:
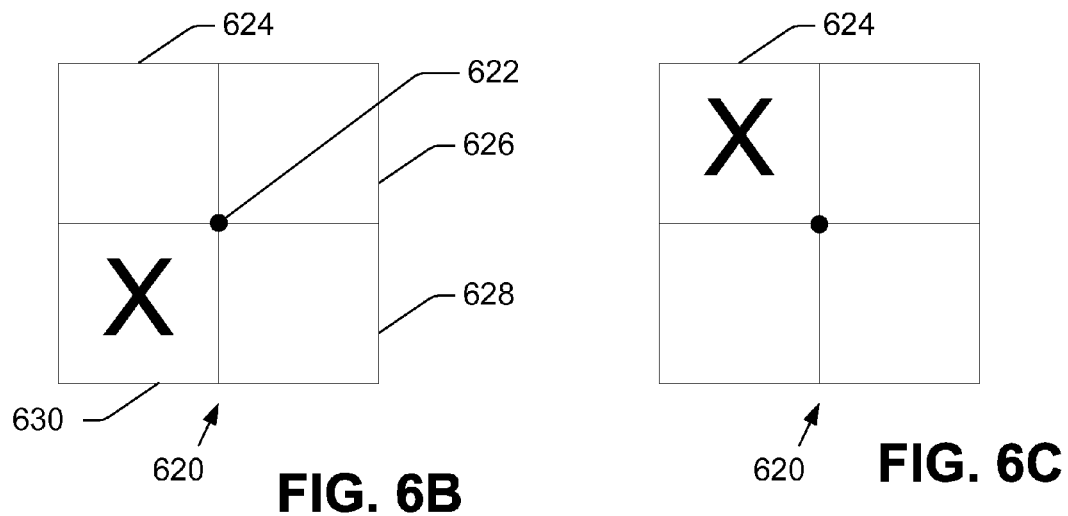
FIGS. 6B-E illustrate a pixel field 620 in accordance with one embodiment.
Figures 6D, 6E:
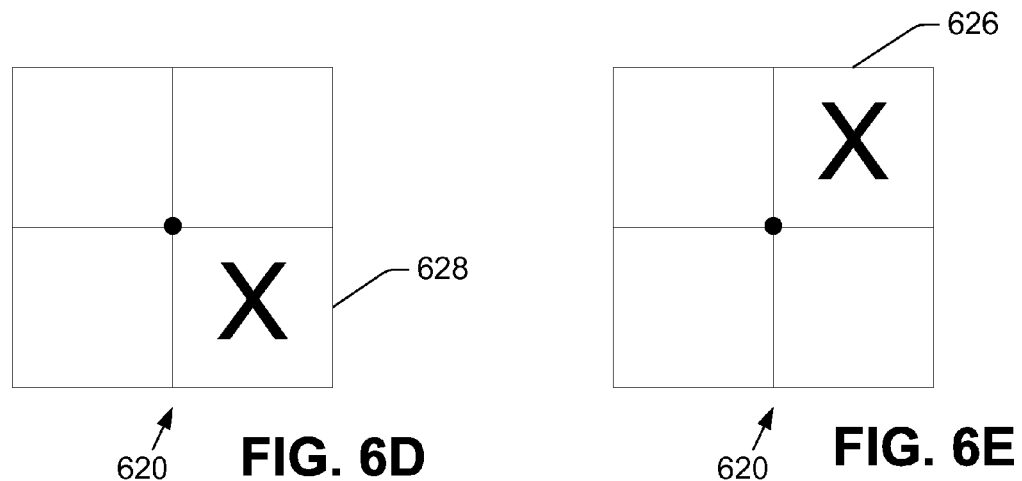

FIG. 6A is an exemplary representation of (524, FIG. 5) and scan flags (526, FIG. 5) as used herein. FIGS. 6B-E illustrate a pixel field 620 in accordance with one embodiment. A memory segment 600 having six memory fields 602-612 is shown in FIG. 6. The memory segment 600 includes memory fields 602, 604, 606, 608 for the pixel state flags (524, FIG. 5) and memory filed 610, 612 for the scan flags 526.

As used herein, the memory fields 602-612 each are a single memory bit. However, other memory allocations may be utilized to perform the same functions as outlined below. In one or more of the implementations described herein, at least one memory segment 600 is associated with each pixel reference point (404, FIG. 4a) in a digital image. Furthermore, it is noted that although the memory fields 602-612 are shown as occupying contiguous positions, it is not necessary to have such a configuration. For example, the memory fields corresponding to the pixel state flags 524 may be stored in a first memory location and the memory fields corresponding to the scan flags 526 may be stored in a second memory location. It is noted, however, that for convenience and efficiency, the memory fields 602-612 may be stored in a single byte (i.e. 8-bit segment) with the memory fields 602-612 occupying six bits of the byte and the remaining two bits being used for one or more other purposes.

A pixel field 620 is shown that includes a pixel reference point 622, an upper left pixel 624, an upper right pixel 626, a lower right pixel 628 and a lower left pixel 630. The pixel positions are determined according to pixel orientations with regard to the pixel reference point 622. In a matrix of several pixels and pixel reference points, such as that shown in FIGS.

3 and 4, a particular pixel may be included in up to four pixel fields and will occupy a different position within each pixel field to which it belongs. It is also noted that pixel reference points situated on a top or bottom row of a pixel field or a left or right margin of a pixel field will only have one or two pixels in a corresponding pixel field.

In the following discussion, a selected pixel within the pixel field 620 is represented by an "X" located within the box representing the pixel. From none to four pixels in the pixel field 620 may be selected at the same time; however, in each example shown, only one pixel is shown as being selected so that positional characteristics may be better described.

Memory field 602 is shown as the least significant bit of the memory segment 600, although the particular position of particular fields may vary between implementations. Memory field 602 corresponds to the lower left pixel 630 in the pixel field 620. During one or more procedures described below, a selected pixel that is the lower left pixel 630 of a pixel field 620 (i.e. the selected pixel is situated left and below a pixel reference point that corresponds to a particular memory segment) is represented by memory field 602. If a bit in memory field 602 is set (i.e. is equal to "1"), then it means that the lower left pixel 630 is selected.

Similarly, memory field 604 corresponds to the upper left pixel 624 of the pixel field 620; memory field 606 corresponds to the lower right pixel 628 pixel of the pixel field 620; and memory field 608 corresponds to the upper right pixel 624 of the memory field 620. Any combination of the pixels in the pixel reference field 620 may be selected at a particular time. If, for instance, the lower left pixel 630 and the lower right pixel 628 are the only pixels of the pixel field 620 that are selected, then the memory segment 600 that includes the pixel state flags 602-608 would have a value of "5" ("0101"). Therefore, combinations of pixels selected can be represented by the pixel state flags 602-608 as a binary number between and including "x0" ("0000") and "x15" ("1111").

The memory segment 600 also includes a first pass flag 610 and a done flag 612. As described in greater detail below, the first pass flag 610 is an indicator that denotes that a pixel reference point has been scanned during a first pass during the procedures outlined below. The done flag 612 is an indicator that denotes that a pixel reference point has been scanned a maximum number of times and that it does not need to be scanned again.

The functions of the elements and features shown in FIGS. 6A-E and described above will be described in greater detail below, with reference to subsequent figures.

Exemplary Flow Diagram: Memory Representations of Pixel Reference Points

FIG. 7 is a flow diagram depicting a methodological implementation of identifying selected pixels in a digital image and assigning memory values that correspond to pixel reference points. In the following discussion, continuing reference will be made to the element and reference numerals of previous figures.

During a procedure to identify selected pixels from a bit mask and determine vectors from which a pixel selection identifier can be rendered, two passes are made over the pixel reference points and/or their corresponding memory fields (i.e. pixel state flags and scan flags). In a first pass—depicted in FIG. 7—selected pixels are determined and appropriate pixels state bits are set in memory fields associated with each pixel reference point. In a second pass—depicted below in discussion of FIG. 8—the pixel states bits and scan flags are utilized to determine a clockwise outline of the selected pixels, i.e. a pixel selection identifier. By "clockwise", it is meant that when determining a direction to extend an outline segment, a clockwise direction is taken when there is a choice of directions to take. Although the description herein utilizes a clockwise manner to determine the outline, it is noted that other implementations may use one or more other ways to determine a direction in which an outline segment should extend.

At block 702, a first pixel reference point 404 (FIG. 4a) is focused on for processing. The first pixel reference point 404 may be any pixel reference point associated with digital image pixels. In the present discussion, the first pixel reference point is a pixel reference point located on a top row and a left margin of an array of pixel reference points of digital image pixels. Also, focus is described as progressing from left to right and from top to bottom as the pixel reference points are processed.

If the pixel reference point is in the first row ("Yes" branch, block 704), then previous bit settings are unavailable for re-use and the pixel state flags 524 must be calculated for each pixel corresponding to the pixel reference point. (Use of previous bit settings will be discussed below.) However, since the pixel reference point is on the first (top) row, there are only two pixels associated with it, namely, a lower left pixel and a lower right pixel.

If the lower left pixel is selected ("Yes" branch, block 710), then a pixel state bit 524 associated with the lower left pixel (FIG. 6, 602) is set at block 712. No pixel state bit is changed if the lower left pixel is not selected ("No" branch, block 710). It is noted that if a pixel reference point is situated in a first column in an array of pixels, then block 710 may be omitted, since there is no lower left pixel associated with such a pixel reference point.

If a lower right pixel is selected ("Yes" branch, block 714), then a pixel state bit 524 associated with the lower right pixel (FIG. 6A, 606) is set at block 716. No pixel state bit is changed if the lower right pixel is not selected ("No" branch, block 714). It is noted that if a pixel reference point is situated in a last column in an array of pixels, then block 714 may be omitted, since there is no lower right pixel associated with such a pixel reference point.

If there are more pixel reference points 404 to process ("Yes" branch, block 718), then the next pixel reference point 404 is focused on at block 720 and the process reverts to block 704 for further processing. After all pixel reference points 404 have been processed ("No" branch, block 718), the process terminates and moves on to the second pass mentioned above.

Referring back now to block 704, if the pixel reference bit is not on the first row ("No" branch, block 704), then processing can be optimized by utilizing pixel state bit settings from a previous line (block 706). For example, an upper right and upper left pixel corresponding to a pixel reference point on the second row are the same as a lower right pixel and a lower left pixel from the first line. In other words, it has already been determined if either or both of the pixels have been selected. This information can be used when processing the second row by performing a one-bit right shift operation on the pixel reference point situation immediately above the pixel reference point being processed. This operation works in cases wherein the memory fields 602-608 are in the order shown in the memory segment 600 of FIG. 6A. If other configuration or orders of memory fields are used, then a different shift operation could be used to re-use the previously used information regarding selected bits.

If the pixel reference bit is not located on the last row of a pixel array ("No" branch, block 710), then blocks 710-714 are repeated as previously described. If, however, the pixel reference bit is located on the last row ("Yes" branch, block 710), then there are no pixels below the pixel reference point, so blocks 710-714 are skipped and processing continues at block 718.

Exemplary Flow Diagram: Determination of Selected Pixel Identifier

FIG. 8 is a flow diagram depicting an exemplary methodological implementation of determining a selected pixel identifier that demarcates selected pixels from unselected pixels. The flow diagram depicted in FIG. 8 represents processing during a second pass as referenced above. In the following discussion of FIG. 8, continuing reference is made to elements and reference numerals of previous figures.

At block 802, pixel state flags 524 corresponding to a first pixel reference point 404 are focused on. As in the previous example of FIG. 7, the following discussion assumes the first pixel reference point is situation on the top row and the left margin of an array of pixels and pixel reference points. The following example deals with finding outer edges of a pixel selection, i.e. a border, so that a line of some type may be rendered around a group of selected pixels.

If no pixel state flags 524 associated with the pixel reference point currently in focus are set (i.e. equal zero in the described implementation) or if all the pixel state flags 524 are set (i.e. equal to fifteen in the described implementation) ("Yes" branch, block 804), then the process skips to block 818 where it is determined if there are more pixel reference points to process. If there are more pixel reference points to process ("Yes" branch, block 818), the pixel state flags for a next pixel reference point are brought into focus (block 820) and the process repeats from block 804.

If at least one of the pixel state flags 524 are set (i.e. not equal to zero in the present implementation) ("No" branch, block 804), the one or more possible directions in which to proceed from the pixel reference point currently in focus are determined at block 806. There are one or two possible directions to go from a particular pixel reference point—straight ahead or turn ninety degrees. It is noted that in the implementation described herein, when a turn in different directions is possible, the turn is made in the first possible direction that is clockwise from the current pixel reference point.

Table 1, shown below, depicts which directions are available for particular configurations of a pixel field (i.e. pixels surrounding a particular pixel reference point). It is noted that for bit setting of "0000" and "1111"), the following table is not applicable. This is because in the case of "0000", the pixel reference point cannot be a border point. In the case of "1111", the pixel reference point is an internal point and, hence, is not a border point. Also, an "X" indicates a selected pixel in the pixel field and an "O" depicts a non-selected pixel. The pixel field pattern denotes four pixels situated around a central pixel reference point.

TABLE 1

| Pixel Field Pattern | Pixel State Flags Representation | Possible Directions to Proceed |
|---|---|---|
| OO OO | 0000 | N/A |
| OO XO | 0001 | Down |
| XO OO | 0010 | Left |
| OO OX | 0011 | Down |
| OX OO | 0100 | Right |
| OO XX | 0101 | Right |

TABLE 1-continued

| Pixel Field Pattern | Pixel State Flags Representation | Possible Directions to Proceed |
|---|---|---|
| XO OX | 0110 | Right or Left |
| XO XX | 0111 | Right |
| OX OO | 1000 | Up |
| OX XO | 1001 | Up or Down |
| XX OO | 1010 | Left |
| XX XO | 1011 | Down |
| OX OX | 1100 | Up |
| OX XX | 1101 | Up |
| XX OX | 1110 | Left |
| XX XX | 1111 | N/A |

If there is not a choice of directions in which to move ("No" branch, block 808), then the done flag (612, FIG. 6A) is set at block 812. When the done flag 612 is set, it indicates that the pixel reference point has been processed for every possible direction that can be taken from the pixel reference point. When a pixel reference point is reached where the done flag 612 is set, then it means a border has been closed for a particular grouping of pixels. Processing then continues to find any other grouping of selected pixels that may require another border (i.e. a selected pixel identifier).

If there is a choice of directions in which to move ("Yes" branch, block 808), then it is determined if this pixel reference point traversal is the first time that the focused pixel reference point has been processed. If this is the first time through the focused pixel reference point ("Yes" branch, block 810), then the first pass flag (610, FIG. 6A) is set at block 814. If this is not the first time through the focused pixel reference point, i.e., the first pass flag 610 is already set ("No" branch, block 810), then the done flag 612 is set at block 812.

After either the done flag 612 or the first pass flag 610 is set, the outline, or border, is extended in the determined direction at block 816. If there are more pixel reference points to process ("Yes" branch, block 818), then a next pixel reference point is focused on at block 820 and the process reverts to block 804 for further processing.

Elimination of "Islands" and "Holes"

Figure 9:
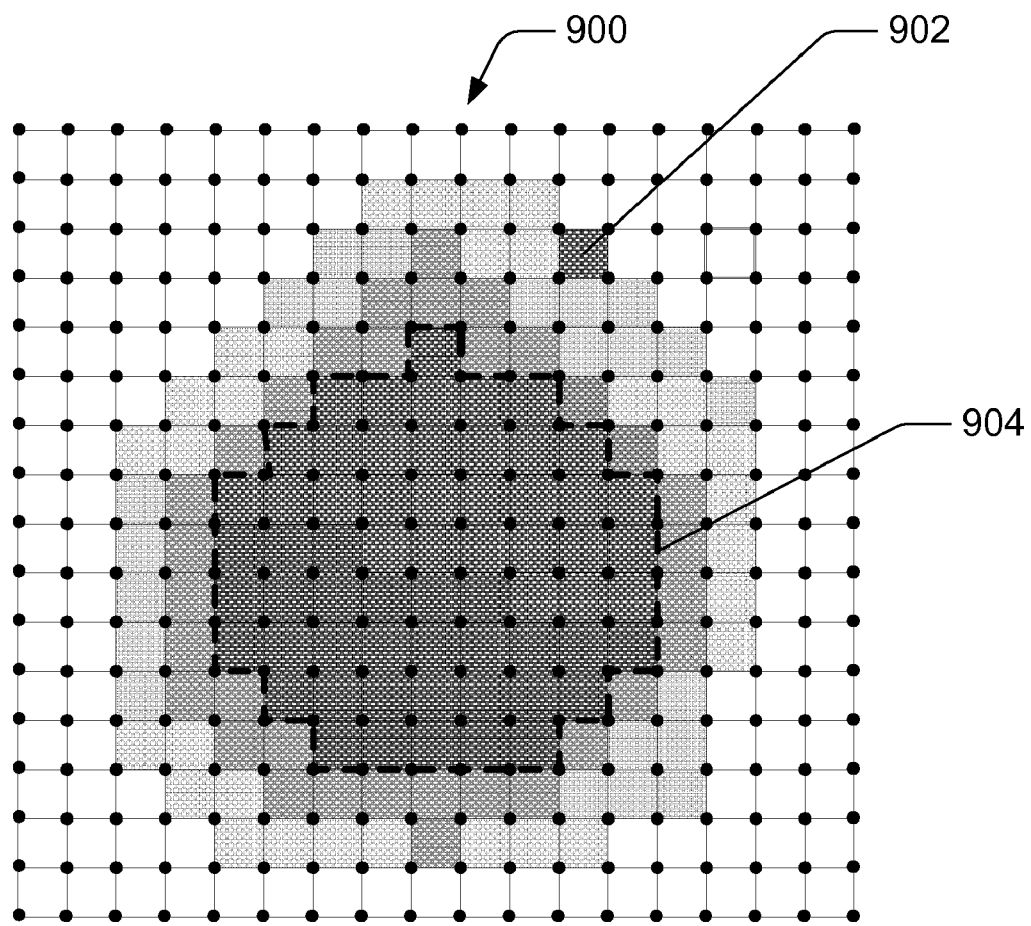
FIG. 9 is an exemplary representation of pixel selection in a digital image.

FIG. 9 is an exemplary representation of pixel selection in a digital image 900. There may be some instances in which a single or a small group of pixel has been selected that is set apart from one or more larger groups of selected pixels, thus forming an "island" selection in the digital image. This situation is depicted in FIG. 9, where an "island" selection 902 appears separately from a larger selection 904.

Similarly, there may be instances in which a single or small group of pixels appearing within a larger group of selected pixels are not selected, thus forming "holes" in the selection. In either case, it may be desirable to eliminate such "islands" and "holes."

In at least one implementation, processing may occur after one or more pixel selection identifiers have been determined (FIG. 7 and FIG. 8). Pixels and/or small groups of pixels that are bordered by a pixel selection identifier may have the pixel selection identifier removed therefrom. In other words, a single pixel that has or is to have a border drawn around it as a selected pixel may be displayed without the border. In at least one implementation, those pixels may be removed from pixel selection itself as well.

A threshold may be set for a certain number of pixels, say one or two. When a pixel selection identifier is determined to be placed around a group of pixels equal to or less than the threshold, the pixel selection identifier is not displayed around the small pixel selection so that "island" selections and "hole" selections are not identified. If desired, those pixels may then be removed from the pixel selection (for "islands"), or added to the pixel selection (for "holes").

Exemplary Computing Environment

Figure 10:
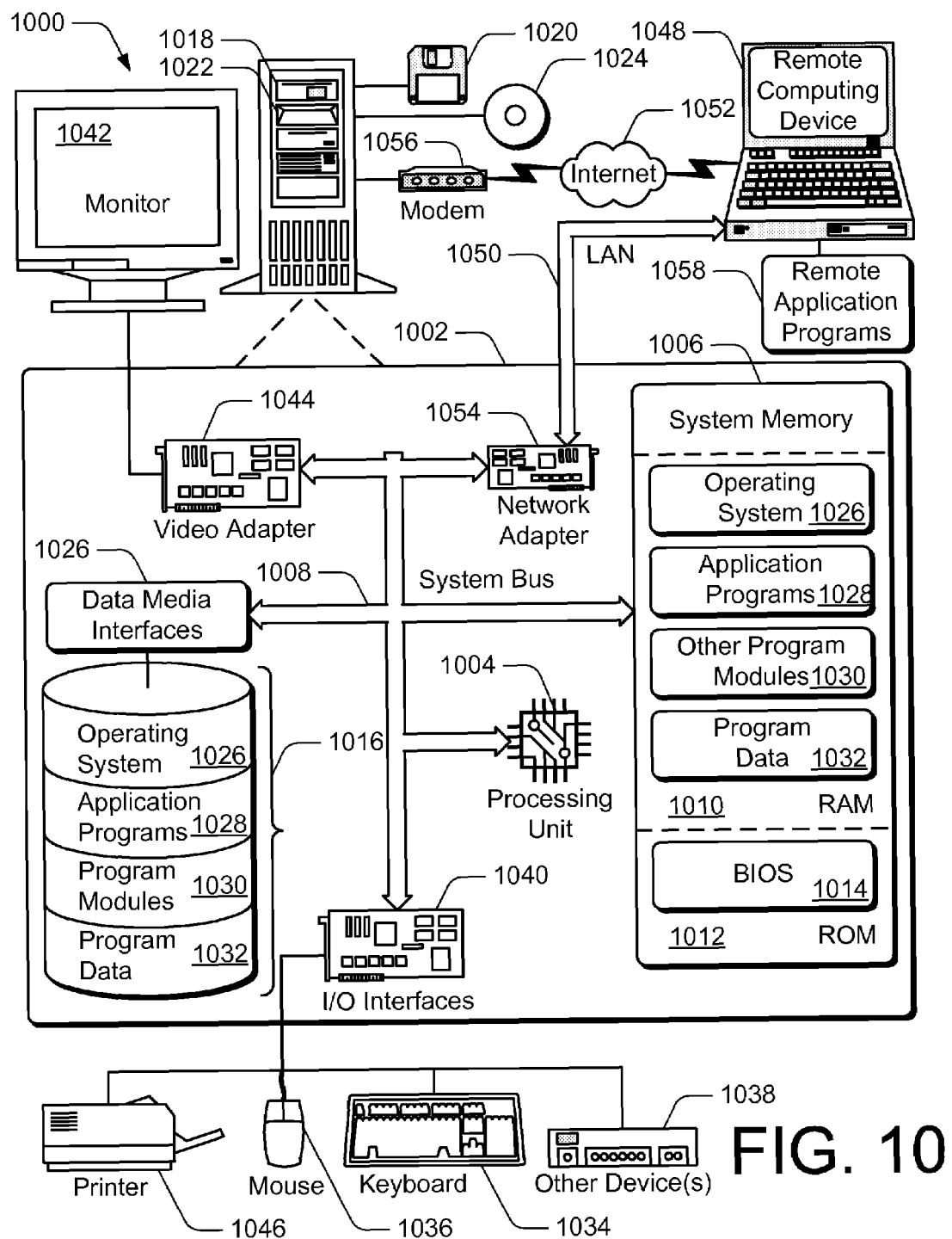
FIG. 10 is a block diagram of an exemplary computer environment within which the systems and methods described herein may be implemented.

FIG. 10 illustrates an exemplary computing environment 1000 within which user interface transition systems and methods, as well as the computing, network, and system architectures described herein, can be either fully or partially implemented. Exemplary computing environment 1000 is only one example of a computing system and is not intended to suggest any limitation as to the scope of use or functionality of the architectures. Neither should the computing environment 1000 be interpreted as having any dependency or requirement relating to any one or combination of components illustrated in the exemplary computing environment 1000.

The computer and network architectures in computing environment 1000 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1000 includes a general-purpose computing system in the form of a computing device 1002. The components of computing device 1002 can include, but are not limited to, one or more processors 1004 (e.g., any of microprocessors, controllers, and the like), a system memory 1006, and a system bus 1008 that couples the various system components. The one or more processors 1004 process various computer executable instructions to control the operation of computing device 1002 and to communicate with other electronic and computing devices. The system bus 1008 represents any number of several types of bus structures, including a memory bus or memory controller, a peripheral bus, an accelerated graphics port, and a processor or local bus using any of a variety of bus architectures.

Computing environment 1000 includes a variety of computer readable media which can be any media that is accessible by computing device 1002 and includes both volatile and non-volatile media, removable and non-removable media. The system memory 1006 includes computer-readable media in the form of volatile memory, such as random access memory (RAM) 1010, and/or non-volatile memory, such as read only memory (ROM) 1012. A basic input/output system (BIOS) 1014 maintains the basic routines that facilitate information transfer between components within computing device 1002, such as during start-up, and is stored in ROM 1012. RAM 1010 typically contains data and/or program modules that are immediately accessible to and/or presently operated on by one or more of the processors 1004.

Computing device 1002 may include other removable/non-removable, volatile/non-volatile computer storage media. By way of example, a hard disk drive 1016 reads from and writes to a non-removable, non-volatile magnetic media (not shown), a magnetic disk drive 1018 reads from and writes to a removable, non-volatile magnetic disk 1020 (e.g., a "floppy disk"), and an optical disk drive 1022 reads from and/or writes to a removable, non-volatile optical disk 1024 such as a CD-ROM, digital versatile disk (DVD), or any other type of optical media. In this example, the hard disk drive 1016, magnetic disk drive 1018, and optical disk drive 1022 are each connected to the system bus 1008 by one or more data media interfaces 1026. The disk drives and associated computer readable media provide non-volatile storage of computer readable instructions, data structures, program modules, and other data for computing device 1002.

Any number of program modules can be stored on the hard disk 1016, magnetic disk 1020, optical disk 1024, ROM 1012, and/or RAM 1010, including by way of example, an operating system 1026, one or more application programs 1028, other program modules 1030, and program data 1032. Each of such operating system 1026, application programs 1028, other program modules 1030, and program data 1032 (or some combination thereof) may include an embodiment of the systems and methods described herein.

Computing device 1002 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, other wireless media, and any combination thereof.

A user can interface with computing device 1002 via any number of different input devices such as a keyboard 1034 and pointing device 1036 (e.g., a "mouse"). Other input devices 1038 (not shown specifically) may include a microphone, joystick, game pad, controller, satellite dish, serial port, scanner, and/or the like. These and other input devices are connected to the processors 1004 via input/output interfaces 1040 that are coupled to the system bus 1008, but may be connected by other interface and bus structures, such as a parallel port, game port, and/or a universal serial bus (USB).

A monitor 1042 or other type of display device can be connected to the system bus 1008 via an interface, such as a video adapter 1044. In addition to the monitor 1042, other output peripheral devices can include components such as speakers (not shown) and a printer 1046 which can be connected to computing device 1002 via the input/output interfaces 1040.

Computing device 1002 can operate in a networked environment using logical connections to one or more remote computers, such as a remote computing device 1048. By way of example, the remote computing device 1048 can be a personal computer, portable computer, a server, a router, a network computer, a peer device or other common network node, and the like. The remote computing device 1048 is illustrated as a portable computer that can include many or all of the elements and features described herein relative to computing device 1002.

Logical connections between computing device 1002 and the remote computing device 1048 are depicted as a local area network (LAN) 1050 and a general wide area network (WAN) 1052. Such networking environments are commonplace in offices, enterprise-wide computer networks, intranets, and the Internet. When implemented in a LAN networking environment, the computing device 1002 is connected to a local network 1050 via a network interface or adapter 1054. When implemented in a WAN networking environment, the computing device 1002 typically includes a modem 1056 or other means for establishing communications over the wide area network 1052. The modem 1056, which can be internal or external to computing device 1002, can be connected to the system bus 1008 via the input/output interfaces 1040 or other appropriate mechanisms. The illustrated network connections are exemplary and other means of establishing communication link(s) between the computing devices 1002 and 1048 can be utilized.

In a networked environment, such as that illustrated with computing environment 1000, program modules depicted relative to the computing device 1002, or portions thereof, may be stored in a remote memory storage device. By way of example, remote application programs 1058 are maintained with a memory device of remote computing device 1048. For purposes of illustration, application programs and other executable program components, such as the operating system 1026, are illustrated herein as discrete blocks, although it is recognized that such programs and components reside at various times in different storage components of the computing device 1002, and are executed by the processors 1004 of the computing device.

While at least the best mode implementation has been illustrated and described, it will be appreciated that various changes can be made therein without departing from the spirit and scope of the following claims.

The embodiments of the invention in which an exclusive property or privilege is claimed are defined as follows:

1. A method, comprising:
    for each pixel reference point in a digital image that includes a plurality of pixels, setting one or more pixel state flags to indicate which of one or more pixels in a pixel field adjacent to the pixel reference point is selected, there being a set of pixel state flags associated with each pixel reference point, wherein when four pixels are in the pixel field adjacent to the pixel reference point, the pixel state flags associated with the pixel reference point include an upper right flag indicating whether a pixel above and right of the pixel reference point is selected, a lower right flag indicating whether a pixel below and right of the pixel reference point is selected, an upper left flag indicating whether a pixel above and left of the pixel reference point is selected and a lower left flag indicating whether a pixel below and left of the pixel reference point is selected, the setting of the one or more pixel state flags being controlled by a processor;
    traversing the pixel state flags to determine a location for a selected pixel identifier that encompasses one or more sets of selected pixels;
    wherein setting the one or more pixel state flags includes
        determining the sets of pixel state flags associated with each of a first lineal grouping of pixel state flags, and for each set of pixel state flags associated with an adjacent lineal grouping of pixel state flags, setting at least half of the set of pixel state flags by performing a bit shift operation on at least one of the upper right flag, the lower right flag, the upper left flag or the lower left flag of an adjacent set of pixel state flags, the adjacent set of pixel state flags being adjacent to the set of pixel state flags being set and the adjacent set of pixel state flags being one of the first lineal grouping of pixel state flags;
    rendering the selected pixel identifier on a display device.

2. The method as recited in claim 1, further comprising determining a direction in which a segment of the selected pixel identifier extends from a pixel reference point from a value of the pixel state flags.

3. The method as recited in claim 1, wherein pixel reference points further comprise pixel vertices.

4. The method as recited in claim 1, wherein a pixel field includes from one to four pixels, depending on a location of a pixel reference point in the digital image.

5. The method as recited in claim 1, further comprising setting one or more scan flags associated with a pixel reference point when a set of pixel state flags associated with the pixel reference point is traversed.

6. The method as recited in claim 5, further comprising scan flags that identify a number of times that a set of pixel state flags has been traversed.

7. The method as recited in claim 5, further comprising scan flags that indicate whether a set of pixel state flags can be traversed a subsequent time.

8. The method as recited in claim 1, further comprising omitting a selected pixel identifier if the selected pixel identifier encompasses less than a minimum threshold of pixels.

9. The method as recited in claim 8, further comprising changing pixels appearing within the selected pixel identifier to appear similar to pixels immediately adjacent to the pixels appearing within the selected pixel identifier.

10. A system, comprising:
    a processor;
    a digital image stored in memory, the digital image including multiple pixels;
    the processor operating with the memory to provide:
        a pixel selection module configured to select one or more pixels in the digital image;
        a plurality of pixel state flags stored in memory;
        a pixel selection identification module configured to:
            configure a set of pixel state flags for each of a plurality of pixel reference points in the digital image to indicate which pixels associated with the pixel reference points are selected, wherein when four pixels are associated with a first pixel reference point, the pixel state flags associated with the first pixel reference point include an upper right flag indicating whether a pixel above and right of the pixel reference point is selected, a lower right flag indicating whether a pixel below and right of the pixel reference point is selected, an upper left flag indicating whether a pixel above and left of the pixel reference point is selected and a lower left flag indicating whether a pixel below and left of the pixel reference point is selected, wherein configuring the sets of pixel state flags further comprises determining the sets of pixel state flags associated with each of a first lineal grouping of pixel state flags, and for each set of pixel state flags associated with an adjacent lineal grouping of pixel state flags, configuring at least half of the set of pixel state flags by performing a bit shift on a configuration stored for a previously configured set of pixel state flags, performing the bit shift including bit shifting at least one of the upper right flag, the lower right flag, the upper left flag or the lower left flag of the previously configured set of pixel state flags, the previously configured set of pixel state flags being adjacent to the set of pixel state flags being configured and the previously configured set of pixel state flags being one of the first lineal grouping of pixel state flags; and scan the sets of pixel state flags to determine where a selected pixel identifier will encompass all of a group of contiguous selected pixels.

11. The system as recited in claim 10, wherein if there are more than one contiguous group of selected pixels, a selected pixel identifier is determined for each group of selected pixels.

12. The system as recited in claim 10, further comprising one or more scan flags associated with each set of pixel state flags that are set according to how many times a set of pixel state flags has been scanned.

13. The system as recited in claim 10, further comprising determining a vector for each of multiple selected pixel identifier segments according to one or more sets of pixel state flags associated with the selected pixel identifier segments.

14. The system as recited in claim 13, further comprising determining a vector that determines at least a direction of a corresponding selected pixel identifier segment.

15. The system as recited in claim 13, wherein the determining is based on a value of a set of pixel state flags.

16. The system as recited in claim 10, wherein pixel reference identifiers are identified at each vertex of a pixel.

17. One or more computer storage media containing computer-executable instructions that, when executed on a computer, perform the following steps:
   identifying a plurality of pixel reference points in a digital image having multiple pixels, each pixel reference point corresponding to one or more of the pixels;
   associating a memory value with each pixel reference point, each memory value denoting which of one or more pixels adjacent to a corresponding pixel reference point are selected, the memory value including a set of pixel state flags to indicate which of one or more pixels in a pixel field adjacent to the pixel reference point is selected, wherein when four pixels are in the pixel field adjacent to the pixel reference point, the set of pixel state flags associated with the pixel reference point includes an upper right flag indicating whether a pixel above and right of the pixel reference point is selected, a lower right flag indicating whether a pixel below and right of the pixel reference point is selected, an upper left flag indicating whether a pixel above and left of the pixel reference point is selected and a lower left flag indicating whether a pixel below and left of the pixel reference point is selected, wherein associating the memory value includes:
      determining the sets of pixel state flags associated with each of a first lineal grouping of pixel state flags, and for each set of pixel state flags associated with an adjacent lineal grouping of pixel state flags,
         setting at least half of the set of pixel state flags by performing a bit shift operation on at least one of the upper right flag, the lower right flag, the upper left flag or the lower left flag of an adjacent set of pixel state flags, the adjacent set of pixel state flags being adjacent to the set of pixel state flags being set and the adjacent set of pixel state flags being one of the first lineal grouping of pixel state flags;
   scanning the memory values to determine a border of at least one group of contiguous selected pixels; and
   identifying a single unselected pixel surrounded by selected pixels and selecting the unselected pixel.

18. The one or more computer storage media as recited in claim 17, wherein each pixel reference point is a pixel vertex.

19. The one or more computer storage media as recited in claim 17, wherein:
   each pixel reference point is associated with from one to four pixels; and
   each memory value further comprises four bits, each bit corresponding to a possible pixel associated with the pixel reference point that corresponds to the memory value.

20. The one or more computer storage media as recited in claim 17, further comprising ignoring a border of a group of contiguous selected pixels if the group of contiguous selected pixels contains a number of pixels that is less than a specified minimum threshold.

21. The one or more computer storage media as recited in claim 17, the scanning step further comprising for each border pixel reference point, determining a vector that indicates where a subsequent border segment should extend from the border pixel reference point.

22. The one or more computer storage media as recited in claim 21, the scanning step further comprising referencing one or more scan flags associated with a border pixel reference point to determine if the border pixel reference point has been previously scanned.

23. The one or more computer storage media as recited in claim 21, the scanning step further comprising referencing one or more scan flags associated with a border pixel reference point to determine if a border has been completed around a particular group of selected pixels.

24. The one or more computer storage media as recited in claim 17, further comprising rendering the border.

25. The one or more computer storage media as recited in claim 17, further comprising utilizing a previously stored memory value to determine a memory value corresponding to a pixel reference point.

26. The one or more computer storage media as recited in claim 17, further comprising the step of identifying a single selected pixel surrounded by unselected pixels and unselecting the single selected pixel.

27. The one or more computer storage media as recited in claim 26, further comprising rendering the single selected pixel to appear similar to the surrounding unselected pixels.

28. The one or more computer storage media as recited in claim 17, further comprising rendering the single unselected pixel to appear similar to the surrounding selected pixels.

* * * * *